United States Patent [19]
Tanaka et al.

[11] 3,926,502
[45] Dec. 16, 1975

[54] LIQUID-CRYSTAL DISPLAY CELL AND METHOD OF MAKING SAME

[75] Inventors: Eiichiro Tanaka, Kawagoe; Katsuo Nishimura, Tokyo; Hiroshi Shimizu, Kawagoe; Masao Koshi, Higashikurume, all of Japan

[73] Assignee: Citizen Watch Co., Ltd., Tokyo, Japan

[22] Filed: July 18, 1973

[21] Appl. No.: 380,281

[30] Foreign Application Priority Data
July 21, 1972 Japan................................ 47-72468
Jan. 29, 1973 Japan................................ 48-10987
May 8, 1973 Japan................................ 48-50966

[52] U.S. Cl. .......................................... 350/160 LC
[51] Int. Cl.² .......................................... G02F 1/13
[58] Field of Search....................... 350/160 LC, 150

[56] References Cited
UNITED STATES PATENTS
| | | | |
|---|---|---|---|
| 3,784,280 | 1/1974 | Bigelow................. | 350/160 LC X |
| 3,787,110 | 1/1974 | Berreman et al............ | 350/160 LC |
| 3,799,649 | 3/1974 | Carlyle........................ | 350/160 LC |

OTHER PUBLICATIONS
"Liquid Crystal Cell Filling," by Edmonds et al., *IBM Disclosure Bulletin*, Vol. 16, No. 2, July 1973.

"Thin Film Surface Orientation For Liquid Crystals," by Janning, *Appl. Phys. Ltrs.*, Vol. 21, No. 4, Aug. 1972.

Primary Examiner—Vincent P. McGraw
Assistant Examiner—Paul K. Godwin
Attorney, Agent, or Firm—Ernest G. Montague; Karl F. Ross; Herbert Dubno

[57] ABSTRACT

A liquid-crystal displaying cell comprising two glass substrates disposed in parallel and spaced apart from each other and hermetically sealed together along their edges by means of a low melting point glass layer to form a space between the plates. Heat resistant crystal orientating layers are comprised by obliquely deposited thin films of silicon oxide etc. which are vapor deposited on each of the opposed surfaces of thin electrode films formed on the inner surface of the glass substrate or by minute grooves mechanically formed on each of opposed surfaces of the thin electrode films. The cell is provided with a single opening through which air is vented from the cell compartment and liquid crystal substance is injected. The opening is then hermetically sealed by a low melting-point metal. The air evacuation and injection of the liquid crystal substance through the opening and the sealing of the opening are effected in a container the interior of which is maintained at a reduced pressure.

5 Claims, 8 Drawing Figures

LIQUID-CRYSTAL DISPLAY CELL AND METHOD OF MAKING SAME

FIELD OF THE INVENTION

This invention relates to a liquid-crystal displaying cell and to a method of making such a cell and, more particularly to a TWIST mode liquid crystal displaying cell and a method of injecting liquid crustal substance crystal such cell and hermetically sealing latter.

BACKGROUND OF THE INVENTION

It has been proposed heretofore to apply the electro-optical effect of liquid crystal substances in a to an display apparatus. Such display apparatus makes use of a liquid crystal display cell comprising two glass substrates or plates between which is formed a space enclosing the liquid crystal substance which is sealed in the space. Each of these glass substrates is provided at its inner surface with an electrode film formed thereon. An electric voltage applied to these electrode films results in an electro-optical modulation of the liquid crystal substance and generates a display of desired patterns corresponding to the shape of the electrode films. In order to attain such electro-optical modulation of the liquid crystal substance, two driving systems have been well known. One is a dynamic light scattering mode driving system and the other is TWIST mode driving system. In the TWIST mode driving system, molecular arrangements of the liquid crystal are controlled so as to cause a rotation of the polarizing surface thereof. In case of applying the above mentioned displaying apparatus to a wrist watch so as to obtain its time indication, the liquid crystal displaying cell adapted to be operated by the dynamic light scattering mode consumes an electric power of about $50 \mu W/cm^2$, while the liquid crystal displaying cell adapted to be operated by the TWIST mode consumes an electric power of $5 \mu W/cm^2$ which is equivalent to one-tenth of the former. Accordingly, it is preferable to apply the TWIST mode to a wrist watch which makes use of a small battery as its electric power supply source.

Heretofore, it has been the common practice to manufacture the TWIST mode liquid crystal cell by the following steps: The glass substrates are each provided at one surface with transparent electrode film. Each of these transparent electrode films is formed with an orientating layer adapted to orient molecules of the liquid crystal. This orientating layer is formed by rubbing the electrode film surface in one direction with the aid of a cotton cloth or is formed by rubbing the electrode film in one direction with the aid of a surface active agent. Then, the two glass substrates are arranged parallel to each other with their orientating layers opposed and having their orientation directions at right angles to each other. In this case, the two glass substrates are spaced apart by about $10 \mu$ and the space formed between the glass substrates are sealed by means of an epoxy resin etc. The resin layer is provided with an opening through which is injected the liquid crystal into the space. Then, the opening is sealed by a cementing agent.

The liquid-crystal displaying cell constructed in accordance with the above method is provided with the orientating layers disposed between the upper and lower glass substrates and crossed perpendicular each other, and as a result, the liquid crystal injected into the space has its molecules arranged in the TWIST construction, and hence an electric voltage applied to the electrode films causes the liquid crystal layer to be driven by the TWIST mode. This liquid crystal layer whose molecules are arranged in the TWIST construction has a polarizing surface which can rotate incident light. This TWIST construction becomes reversibly broken by the application of electric voltage. Thus, the liquid crystal displaying cell is capable of operating as a light valve and displaying desired patterns corresponding to the shape of the electrode films by means of an electric voltage applied thereto. Details of the above mentioned liquid-crystal displaying cells are described in Applied Physics Letters, Vol. 18, No 4 (1971).

The conventional liquid-crystal display cell as above described makes use of organic substances such as epoxy resin for sealing the peripheral edges of the the two parallel glass substrates so that it has disadvantages in that an insufficient air or liquid tightness thereof causes a penetration of air and water into the cell so that the liquid crystal substance becomes modified and deteriorates, and that the thermal expansion coefficient of the organic substance which is considerably larger than that of glass causes the sealed portions to be peeled off because of temperature fluctuations.

The above mentioned disadvantages could be obviated by the use of inorganic substances such as a low melting point glass or low melting point metal etc. However, if the TWIST mode liquid crystal displaying cell is heated to a temperature of about 450°C in order to melt the low melting point glass or metal so as to connect together the two parallel glass substrates, the effect of the orientating layer formed on each transparent electrode film vanishes. As a result, heretofore, it has been impossible to seal a TWIST mode liquid-crystal display cell with the aid of the inorganic substances.

OBJECTS OF THE INVENTION

An object of the invention is to provide a TWIST mode liquid-crystal displaying cell which can obviate the above mentioned disadvantages of the TWIST mode liquid-crystal display cell heretofore proposed and has a high durability.

Another object of the invention is to provide a method of injecting the liquid crystal substance into the space formed between the glass substrates in a simple, easy and reliable manner.

SUMMARY OF THE INVENTION

One of the features of the invention is the provision of a TWIST mode liquid-crystal displaying cell comprising a pair of glass substrates arranged in parallel to each other each of which is provided at its inner surface with transparent electrode films formed thereon, heat resisting orientating layer constructed by obliquely deposited thin films of silica Cr, Al etc. which is vapor deposited on each of the opposed surfaces of said transparent electrode films or by forming minute grooves on each of the opposed surfaces of said transparent electrode films with the aid of a diamond paste, and a low melting point glass layer interposed between edges of said glass substrates and sealing said substrates to form a space therebetween.

A method of manufacturing a TWIST mode liquid crystal displaying cell according to the invention comprises the steps of preparing a pair of glass substrates having a given shape, polishing and washing the surfaces of said glass substrates, forming on one surface of each of said glass substrates a transparent electric ally conductive thin film of $In_2O_3$, $SnO_2$ etc. by vapor deposition of the compound in vacuum, removing part of said thin film to form a transparent electrode film having a given pattern, forming on said transparent electrode film a heat resistant orientating layer composed of an obliquely deposited thin films which is vapour deposited on each of the opposed surfaces of said transparent electrode film or of minute grooves mechanically formed on each of the opposed surface of said transparent electrode film, arranging said glass substrates in parallel to each other so as to form a space therebetween, cementing the edges of said glass substrates by means of a low melting point glass layer interposed between said glass substrates, forming a single opening communicating said space with the exterior of said cell for evacuating gases from said space and injecting a liquid crystal substance into said space and then sealing said opening by means of a low melting point metal, the evacuation of said gases injection of liquid crystal substance, as well as the sealing of the opening, being effected under a reduced-pressure condition.

When the cell is applied to a wrist watch so as to provide a time indication, part of the transparent thin electric conductive film is removed by etching to form numeral displaying patterns consisting of seven segments. In the conventional cell, the orienting layers adapted to orient (direct) molecules of the liquid crystal are formed by rubbing the transparent electrode film surface in one direction with the aid of a cotton cloth etc. as above described. In the present invention, the orientating layers are constructed by obliquely deposited thin films of silicon oxide, Cr, Al etc. which is vapor deposited on each of the opposed surfaces of the transparent electrode films as described in Applied Physics Letters, Vol. 21, No. 4 page 173 or by forming minute grooves on each of the opposed surfaces of the transparent electrode films with the aid of a diamond paste as described in Physical Review Letters, Vol. 28, No. 26, page 1,683. Experiments show that the above described orientating layer formed on each transparent electrode film does heat resistant, and that its effect is not vanished even when it is heated to a temperature of about 450°C at which the low melting point glass is melted so as to seal the edges of the two glass substrate.

The method according to the invention, therefore, makes use one or both of the above mentioned two methods for the purpose of forming the heat-resisting orienting layer on the transparent electrode film.

BRIEF DESCRIPTION OF THE DRAWINGS

Other objects, features and advantages of the invention will be understood from the following description with reference to the accompanying drawing, in which.

SPECIFIC DESCRIPTION

Figure 1:
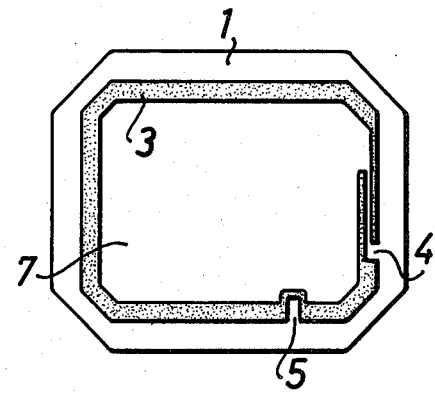
FIG. 1 is a plan view showing a lower glass substrate of a TWIST mode liquid-crystal displaying cell according to the invention.
Figure 2:
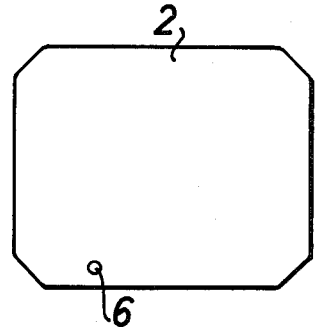
FIG. 2 is a plan view showing an upper glass substrate of the display cell according to the invention.
Figure 3:
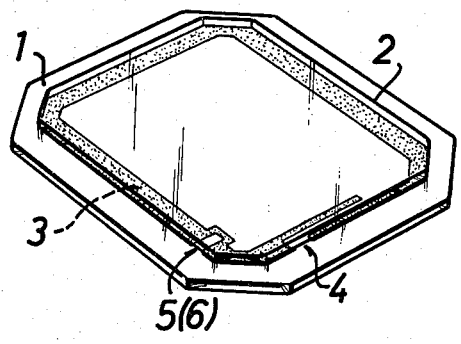
FIG. 3 is a perspective view showing the display cell according to the invention.

Referring to FIGS. 1 and 2, reference numeral 1 dsignates a lower glass substrate and 2 an upper glass substrate. Transparent electrode films formed thereon and a heat resisting orienting layer formed on each of the transparent electrode films are not shown in FIGS. 1 and 2 for ease of illustration.

The lower glass substrate 1 is provided near its edge with a low melting point glass layer 3 deposited thereon by a screen printing process. In FIG. 1, reference numeral 4 designates an opening for exhaustion and liquid crystal substance injection. 5 is a terminal notch formed in the glass layer 3 and adapted to be fitted with a metal terminal pin 6 projecting from the upper glass substrate 2. Through these terminals the electrical contact with the electrodes of both glass substrates is effected.

Figure 4:
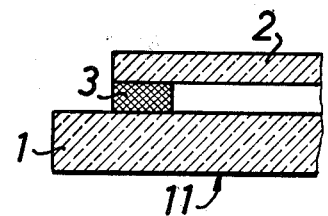
FIG. 4 is an enlarged sectional view showing a part of the display cell shown in FIG. 3.

The glass substrates 1 and 2 are arranged in parallel to each other with their orientating layers opposed and crossed at right angles with each other. The assembly thus obtained is heated at about 450°C in an electric furnace to hermetically seal the edges of these glass substrates 1 and 2 by means of the low melting point glass layer 3 sandwiched therebetween. In this case, the metal terminal pin 6 projecting from the upper glass substrate 2 is connected to the teminal notch 5 formed in the low melting point glass layer 3 provided for the lower glass substrate 1 and the opening 4 remains as it is. In FIG. 4 there are shown, in an enlarged scale, the edges of the upper and lower glass substrates 2 and 1. As seen from FIG. 4, the upper and lower glass substrates 2 and 1 are hermetically sealed by means of the low melting point glass layer 3 having a thickness of about 10 $\mu$ to provide a cell 11.

Figure 5:
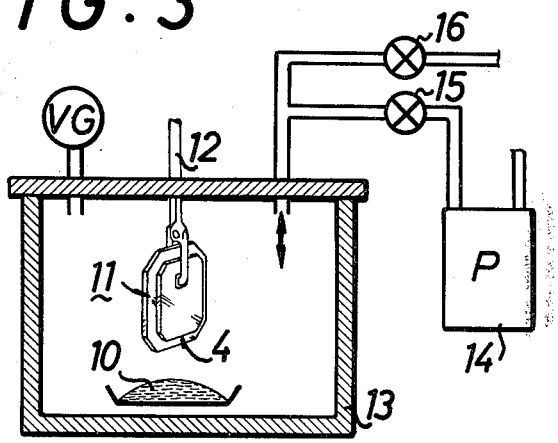
FIG. 5 is a diagrammatic sectional view illustrating a container in which the evacuation of air and injection of the liquid crystal substance are carried out according to the invention.

The cell 11 and a TWIST mode liquid crystal substance 10 are enclosed in a container 13 as shown in FIG. 5. Provision is made of a vacuum pump 14 which can exhaust the interior of the container 13 through a valve 15. In the case, the air in a space 7 interposed between the upper and lower two glass substrates 2 and 1 and surrounded by the glass layer 3 is also exhausted through the opening 4.

Figure 6:
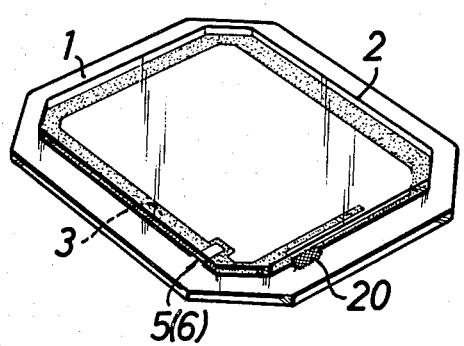
FIG. 6 is a perspective view showing an air exhausting and liquid crystal substance injecting opening sealed by the method according to the invention.

The cell 11 is held by bifurcated ends of a liner 12 and lowered into the container 13 such that the opening 4 is immersed into the liquid crystal substance 10. Then, the valve 15 is closed, while a valve 16 provided for a pipe communicating the container 13 with a dry air supply source is opened to introduce the dry air into the container 13. As a result, the liquid crystal substance 10 is introduced through the opening 4 into the space 7. Then, the opening 4 is hermetically sealed by a mass of a low melting point metal 20 as shown in FIG. 6.

In this case the edge of the opening 4 may be metallized beforehand. The opening 4 which may be metallized, beforehand, may reliably be sealed by the low melting point metal 20.

Figure 7:
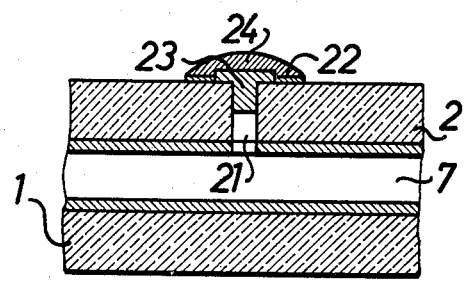
FIGS. 7 and 8 are enlarged sectional views illustrating sealed portions of the cell according to the invention.

In FIG. 7 is shown another embodiment of the TWIST liquid-crystal displaying cell according to the invention. In the present embodiment, the upper glass substrate 2 is provided with an opening 21, which may be formed by a supersonic vibration technique etc. The upper edge of the opening 21 is applied with a mixed paste consisting of Ag and Pd in an electric furnace to form a metallized layer 22 as shown in FIG. 7.

The upper and lower glass substrates 2 and 1 are finally sealed at their edges with the aid of the low melting point glass layer 3. The liquid crystal substance is introduced through the opening 21 into the cell. Then, a metal plug 23 is inserted into the opening 21. The metal plug 23 is covered with a low melting point metal 24 so as to seal the opening 21.

Figure 8:
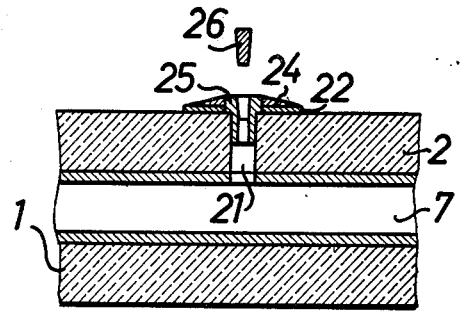

In a further embodiment shown in FIG. 8, metal pipe 25 is inserted beforehand into the opening 21. The metal pipe 25 is soldered to the metallized layer 22 with the aid of a mass of low melting point metal 24 so as to expose the upper end of the metal pipe 25. Then, the liquid crystal substance is injected through the metal pipe 25 into the cell and then a metal plug 26 is forcibly inserted into the metal pipe 25 to seal the hole 21.

Alternatively, the metal pipe 25 may be covered with a low melting point metal so as to seal the opening 21.

As stated hereinbefore, the liquid crystal display cell according to the invention has a number of advantages. In the first place, the cell makes use of an inorganic substance such as a low melting point metal and glass etc. so as to hermetically seal it so that the cell is chemically stable and the liquid crystal substance is prevented from being deteriorated. Secondly, the liquid crystal displaying cell according to the invention is provided with only one opening through which can exhaust air from the cell and can inject the liquid crystal into the cell, and as a result, troublesome sealing operation can simply be effected if compared with the conventional liquid crystal cell which is provided with an air exhaust opening and with a liquid crystal injecting opening independent one from the other. Thirdly, the liquid crystal substance injection is effected in a reduced pressure container so that there is no risk of the liquid crystal substance becoming contaminated by the outside atmosphere contrary to the conventional method in which the liquid crystal substance is injected into the cell in the outside air. Finally, the TWIST liquid crystal displaying cell according to the invention is highly reliable in operation and can maintain its useful life for a long time.

Many tests such as life test at low and high temperature show the surprising result that the liquid crystal displaying cell according to the invention can maintain its effective life for a long time.

What is claimed is:

1. A liquid-crystal display cell comprising:
   a pair of glass substrates disposed parallel to one another and defining between them a space for a liquid crystal substance of the TWIST type;
   transparent electrode films on the confronting surfaces of said substrates;
   a vapor-deposited heat-resistant orienting layer on each of said electrode films, said orienting layers being deposited obliquely on the respective electrode films with the directions of orienting of said layers lying substantially at right angles to one another;
   a low-melting-point glass layer interposed between said substrates and sealing them together along confronting marginal edge portions of the substrates to enclose said substance;
   a single opening formed in said cell and communicating between the exterior of said cell and said space for evacuating air from said cell and injecting said substance into said space, said opening being defined by a metalized wall; and
   a plug composed in part of a low-melting point metal bonded to said metallized wall and closing said opening.

2. The cell defined in claim 1 wherein said opening is formed in said low-melting point glass.

3. The cell defined in claim 1 wherein said opening is formed in one of said substrates.

4. A method of making a liquid-crystal display cell comprising the steps of:
   polishing and washing a respective surface of a pair of glass substrates;
   vapor-depositing on each of said surfaces a respective transport electrically conductive thin film;
   removing part of each of said films to impart a given pattern to the electrode formed by the remainder of the film on the respective substrates;
   obliquely vapor-depositing on each of said electrodes respective heat-resistant orienting layers with respective molecule-orienting directions;
   disposing said substrates in spaced-apart parallel relation with said surfaces juxtaposed and the molecule-orienting directions of said orienting layers at right angles to one another to define a space;
   bonding said substrates together with a low-melting-point glass layer along marginal edges of said surfaces around said space;
   forming an opening communicating between the exterior and said space and metallizing the wall defining said opening;
   evacuating gas from said space and injecting a TWIST mode liquid crystal substance into said space through said opening under a reduced pressure condition; and
   sealing said opening under a reduced pressure condition with a low-melting point metal bonded to the metallized wall.

5. The method defined in claim 4 wherein said opening is closed by soldering into said opening a metal sleeve and thereafter plugging said sleeve.

* * * * *